W. S. SMITH.
EMERGENCY TIRE.
APPLICATION FILED MAR. 3, 1909.
972,274.
Patented Oct. 11, 1910.
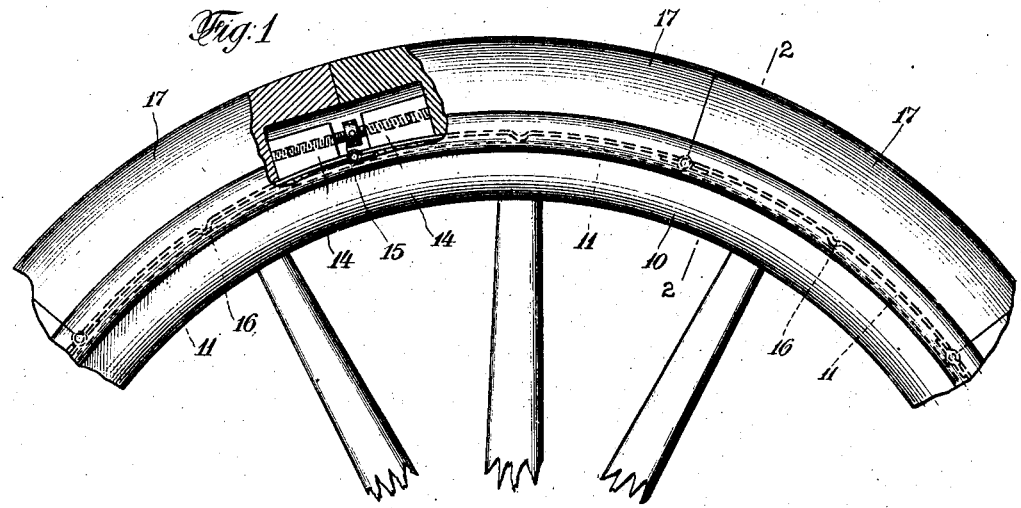
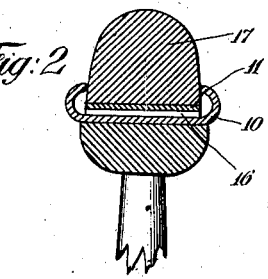
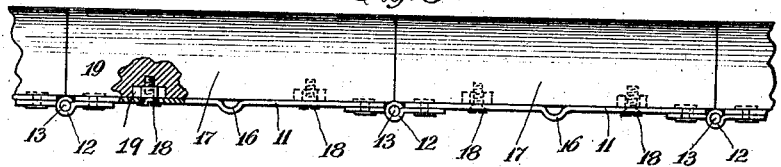
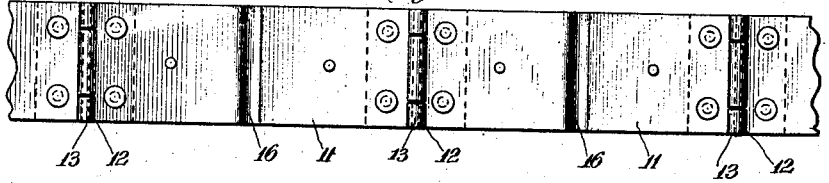
Witnesses:
John E. Prager
Hrg. Cornell
Winfield S. Smith, Inventor
By his Attorney Fred'k P. Schuetz

UNITED STATES PATENT OFFICE.

WINFIELD S. SMITH, OF OSSINING, NEW YORK.

EMERGENCY-TIRE.

972,274.  Specification of Letters Patent.  Patented Oct. 11, 1910.

Application filed March 3, 1909. Serial No. 481,001.

*To all whom it may concern:*

Be it known that I, WINFIELD S. SMITH, a citizen of the United States, and a resident of Ossining, in the county of Westchester and State of New York, have invented certain new and useful Improvements in Emergency-Tires, of which the following is a specification.

My invention relates to temporary tires adapted to replace for a short time injured tires of automobiles and the like.

It has for its object to provide a tire which may be conveniently stored when not in use, and can be quickly and readily applied, in case of accident to the regular collapsible tire, to the rim of the wheel; and which, further, will suffice to enable the journey to be continued until a place is reached where the necessary repairs may be made. By employing a tire of this character to temporarily replace the collapsible tire and its shoe, the injured tire is preserved against further injury, and damages to the rim of the vehicle wheel is avoided.

The nature of my invention will be best understood in connection with the accompanying drawings in which—

Figure 1 is an elevation of a portion of a vehicle wheel with my temporary tire attached. Fig. 2 is a section taken on the line 2—2, Fig. 1. Fig. 3 is a detail view of two adjacent sections. Fig. 4 is a plan view of two sections with the rubber tire removed.

Similar characters of reference designate corresponding parts throughout the several views.

Referring now to the drawings—10 designates the rim of a vehicle wheel of an automobile or the like (not shown), and carrying normally the usual pneumatic inner tire and shoe (not shown). In case of accident to the inner tire or to the shoe, or both, I purpose to replace these by the temporary tire herein set forth, the entire pneumatic tire and its shoe being removed from the rim 10 and the temporary tire substituted.

This tire consists essentially of a series of flat, metal sections 11, the adjacent sections being connected by means of suitable hinges 12 riveted to these sections. The pins 13 of these hinges are inserted so as to be removable if desired, whereby the said sections may be separated into a convenient number of lengths for storage when not in use. The end sections of the series are provided with lugs 14 connected by a turn-buckle 15 operated through a suitable opening (not shown) in the tire and is adapted to draw the series of sections together for the purpose of tightening the same over the rim 10. A transverse depression 16 is preferably provided in each of the sections 11 to afford elasticity; and to enable the tire to be placed on as a whole, in case of use with a detachable rim instead of the clencher rim shown. In this case the turn-buckle 15 may be dispensed with. To each of these flat metal sections 11 is attached a solid piece or section of rubber 17, as by means of screws 18 fitting nuts 19 embedded in the rubber sections 17. These rubber sections are arranged upon the corresponding metal sections 11 in such a manner that, when the tire is fitted over the rim 10, the said sections 17 close to form a substantially solid tread.

I claim:—

The combination with a vehicle wheel, of a temporary solid tire comprising: a series of flat sections each provided with a transverse depression, said sections being hingedly connected; sections of solid, rubber tire carried thereby; and means to draw said series of sections together to tighten the same over the rim of the said vehicle wheel, whereby the adjacent sections of rubber close to form a substantially solid tread.

Signed at Ossining in the county of Westchester and State of New York this 25th day of February A. D. 1909.

WINFIELD S. SMITH.

Witnesses:
HARRISON A. CORNELL, Jr.,
JOHN G. MORTON.